June 10, 1941.   A. BOYAJIAN   2,245,180
ASSEMBLING ELECTROMAGNETIC INDUCTION APPARATUS
Filed Feb. 20, 1940
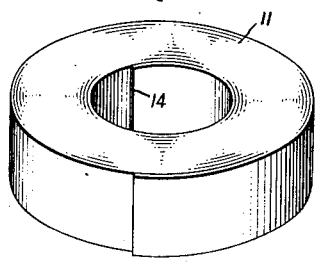
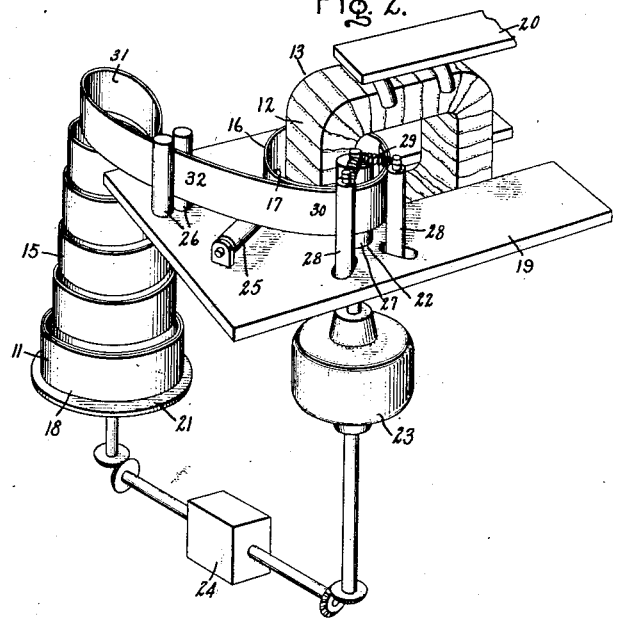
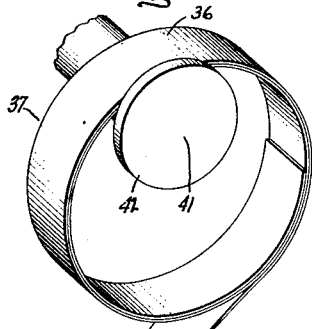
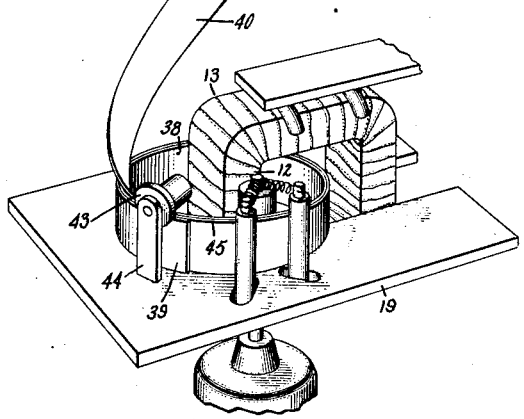
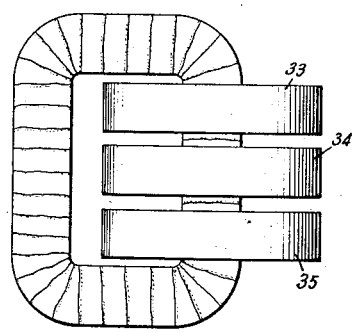
Inventor:
Aram Boyajian,
by Harry E. Dunham
His Attorney.

Patented June 10, 1941

2,245,180

UNITED STATES PATENT OFFICE 2,245,180

ASSEMBLING ELECTROMAGNETIC INDUCTION APPARATUS

Aram Boyajian, Pittsfield, Mass., assignor to General Electric Company, a corporation of New York Application February 20, 1940, Serial No. 319,863

9 Claims. (Cl. 242—4)

My invention relates to methods and apparatus for assembling transformers and reactors and other stationary induction apparatus, and concerns particularly apparatus of the wound-strip-core type.

It is an object of my invention to provide arrangements for assembling heat-treated, hollow, cylindrical, flatwise spirally-wound strip cores having a permanent set with preformed form-wound conductive winding structures, without causing any part of the magnetic material to be stretched or bent beyond the elastic limit or to retain any strains within the elastic limit of such a nature as to cause any deleterious effect on the magnetic properties, without changing the sequence of turns in the heat-treated coil of strip and without need for forming a temporary loop of strip any larger than needed to embrace the winding leg of the conductive winding structure and suitable guide rollers.

My invention relates to modifications in the arrangements described in United States Letters Patent granted to John C. Granfield, May 30, 1939, No. 2,160,588, Electromagnetic induction apparatus and method of making the same, and No. 2,160,589, Apparatus for making strip wound magnetic cores.

In accordance with my invention I form a coil of strip having the same inside and outside diameter which it is to have in the finished core, subject this coil of strip to the requisite heat treatment to bring out its most desirable magnetic properties and I then unwind the strip from the heat-treated coil simultaneously rewinding it into the conductive winding structure. In so doing I unwind the strip beginning at one extremity thereof, and cause the strip to wind off one side (using "side" in the sense of inside or outside) of the finished coil to the opposite side of the completed core without forming any loops surrounding both the original coil of strip and the winding leg. For example, I may wind the strip out of the inside of the original coil of strip onto the outside of the loop formed around the conductive winding leg, or vice versa I may wind the strip off the outside of the original coil of strip into the inside of the loop formed around the conductive winding leg.

The invention will be understood more readily when considered in connection with the accompanying drawing and those features of the invention which are believed to be novel and patentable will be pointed out in the claims appended hereto. In the drawing Fig. 1 is a perspective view of a coil of strip ready to be applied to the conductive winding structure and also represents the appearance of the finished core. Fig. 2 is a perspective view partially diagrammatic of the conductive winding structure with a coil of strip being applied thereto and a machine for carrying out the operation in accordance with one embodiment of my invention. Fig. 3 is a perspective, partially diagrammatic illustration of a modification of the arrangement of Fig. 2, and Fig. 4 is an elevation of a finished electromagnetic induction apparatus constructed in accordance with the embodiments of my invention illustrated in Figs. 2 and 3. Like reference characters are utilized throughout the drawing to designate like parts.

As explained more in detail in the aforesaid Granfield patents, it is advantageous in the construction of electromagnetic induction apparatus to provide a magnetic core which is free from strains above and below the elastic limit, in which the magnetic flux flows parallel to the grain of the magnetic strip employed in building up the core, in order that low-loss magnetic strip material, such as 3% silicon steel strip, may be employed which has most favorable magnetic properties in the direction of the length of the strip, which is the direction of the grain. It is also advantageous to employ preformed form-wound electrical conductive winding structures which may be fully insulated and treated to give high insulation characteristics prior to the assembling with the magnetic core.

In accordance with the arrangement illustrated in Fig. 2, I utilize a coil of strip which has been tightly wound flatwise and heat-treated to build up a strain-free low-loss core of the desired size and shape as illustrated in Fig. 1, and in order to transfer the strip to the conductive winding leg 12 of a winding structure 13, without changing the relative sequence of turns in the coil and without causing the coil to be strained beyond the elastic limit, I draw out the inner end 14 of the strip axially to form a plurality of the inner turns 15 into a conical helix or three-dimension spiral, and I pass the end 14 of the strip around the conductive winding leg 12 to form a loop 16 surrounding the winding leg 12, rotating the loop 16 and feeding the material from the coil 11 onto the outside of the loop 16 to build up a coil surrounding the conductive winding leg 12. As this process is being carried out, more and more of the inner turns of the original coil 11 are drawn out axially into the conical-helix portion 15 so that the strip is continuously being unwound from the inside of the coil 11 and being simultaneously rewound onto the outside of the loop 16. To facilitate the operation, I preferably rotate the coil 11 simultaneously with the rotation of the loop 16, maintaining substantially a constant ratio between the peripheral speed of the inner surface 17 of the loop 16 and the outer surface 18 of the coil 11 so that the linear speed of the transferring strip material, although it varies as more of the strip has been unwound from the coil 11, remains substantially the same in the loop 16 as in the coil 11.

The operation may conveniently be carried out without straining the strip beyond the elastic limit by a machine such as that illustrated schematically in Fig. 2. The machine includes a suitable table 19, clamping means including upper jaws 20 and a lower jaw, not visible, for supporting the winding structure 13 of the winding leg 12 vertically and also includes means for supporting and driving the magnetic strip material. The latter includes a turn table 21 on which the coil 11 rests, which turn table may if desired include external or internal flanges to keep the coil centered on the table 21, a roller gripping arrangement 22 for rotating the loop 16, a motor 23 for driving the turn table 21 and the roller gripping arrangement 22, a speed changing gear 24 for maintaining the proper speed relationship between the turn table 21 and the roller gripping arrangement 22, together with suitable connecting shafts and gearing. Preferably suitable guides are also provided, such as a guide roller 25, rotatably mounted above the table 19 in a horizontal axis to support the portion of the strip being passed to the outside of the loop 16, and a pair of guide rollers 26 secured to the table 19 on vertical axes so positioned that the strip material is passed tangentially from the inside layer of the conical helix 15 to the outside layer of the loop 16. The vertical guide rollers 26 also serve to insure suitable stability of the otherwise unsupported turns in the conical helix portion 15 of the coil 11.

The roller gripping arrangement 22 which is illustrated consists of a roller 27 connected to the shaft of the motor 23 and one or more additional rollers, in this case, a pair of rollers 28 for holding the strip material against the roller 27. In the arrangement illustrated, the rollers 28 are idling rollers and the roller 27 is a driving roller, but my invention does not exclude an arrangement in which the rollers 28 as well, are mechanically connected to the driving motor by means of a suitable flexible linkage, such as that shown in Fig. 17 of Granfield Patent 2,160,- 588, and my invention is not limited to having the driving roller 27 on the inside of the loop 16 and the idling rollers 28 on the outside. Suitable means, such as springs 29, are provided for resiliently pressing the rollers 28 against the roller 27 in order that the strip in the loop 16 will be gripped between the rollers 27 and 28.

It will be observed that if the motor 23 is driven at constant speed the peripheral speed of the inner surface 17 of the loop 16 will remain constant as well as the speed of rotation of the loop 16 and, similarly, the speed of rotation of the turn table 21, as well as the peripheral speed of the outside surface of the coil 11 will also remain constant. Since the strip is feeding from the inside of the coil 11 to the outside of the loop 16 the peripheral speed of the outside surface 30 of the loop 16 will increase at substantially the same rate as the peripheral speed of the inside surface 31 of the coil 11 as the diameter of the loop 16 increases and the radial depth of the coil 11 decreases. In this manner excessive tightness or slackness of the portion 32 of the strip is avoided.

The arrangement is particularly advantageous in cases where it is desired to utilize strip which is relatively narrow in comparison with the diameter of the coil 11, or in cases where it is desired to utilize a core composed of a number of hollow cylinders placed end to end axially, as illustrated in Fig. 4. It will be understood that in assembling electromagnetic induction apparatus illustrated in Fig. 4 on a machine such as that shown in Fig. 2, the uppermost core part 33 is applied first as represented by the stages of proceeding illustrated in Fig. 2; and then by a suitable means, not shown, the coil-supporting clamps 20 are raised, or the table 19, with the strip-carrying apparatus secured thereto, is lowered so that the second core part 34 may be applied directly under the core part 33; additional core parts, such as the core part 35 being applied in succession.

The driving roller 27 and the spring biasing means 29 are so constructed that the springs 29 may be removed and the roller 27 may be lifted off its drive shaft to permit the loop 30 to collapse upon the winding leg 12 to resume the exact size and shape of the original heat-treated coil of strip 11 represented in Fig. 1. If desired, collapsing rollers may be employed for this purpose, as described more in detail in the Granfield patents.

In the process described in connection with Fig. 2 the inner turns of the coil of strip are drawn out of the plane of the main portion of the coil 11 so that the inside turn is in a different plane from the main coil, but parallel thereto, in order that the loop 16 may be formed in a different plane from the main coil for the sake of avoiding interference between the loop 16 being formed and the coil 11 being unwound. Although in the process I have described the planes of the loop 30 and the coil 11 are parallel, it will be understood that my invention is not limited thereto but obviously includes changing the original plane of the turns of strip to a plane making an angle with the plane of the original coil 11 instead of to a parallel plane displaced therefrom. For example, in the modification illustrated in Fig. 3, the plane of the loop formed around the winding leg 13 is perpendicular to the plane of the original coil of strip. In the arrangement of Fig. 3 it is most convenient to make these planes perpendicular to each other, but my invention is not limited to making the angle between the planes 90 degrees.

The arrangement illustrated in Fig. 3 differs from the arrangement of Fig. 2 also in that it is in certain respects the converse. The strip is wound off the outside surface 36 of an original heat-treated coil of strip 37 into the inside surface 38 of a loop 39, being rotated around the conductive winding leg 12. (For the sake of simplicity in the drawing the inner turns of the coil 37 have been omitted.) The loop 37 in this case is supported above the winding structure 13 in such a manner that it is freely rotatable preferably with a horizontal axis of rotation, and preferably far enough above the winding structure 13 to avoid the necessity for sharp bends or excessive curvature in the temporarily twisted portion 40 of the strip. In this manner straining the strip beyond the elastic limit is avoided throughout the process. A rotatably mounted roller 41 having a flange 42 may if desired be employed for supporting the coil 37. For guiding the strip from the portion 40 into the inside of the loop 39, a horizontal-axis flanged roller 43 may be provided which is secured to a bracket 44 on the table 19 and bears upon the upper edge 45 of the loop 39.

Because of changing the direction of the axis of the turns of strip in passing from the coil 37 to the loop 39 it is unnecessary to have more than a fraction of a turn of strip in the transition portion 40 corresponding to the transition portion consisting of the plurality of turns of strip in the conical helix 15 of Fig. 2. However, my invention is not limited to using only a fraction of a turn of strip in the transition portion 40 when the plane of the loop 39 is at an angle to the plane of the coil 37.

Although in connection with Fig. 2 I have described an arrangement in which the plane of the loop 16 is kept parallel to the plane of the main portion of the coil 11 and the strip is drawn out of the inside of the coil 11 and passed to the outside of the loop 16, it will be understood that the use of my method for changing the plane of the turns of strip without changing the angle of the plane is not limited to the arrangement in which the strip is drawn from the inside of the coil of strip to the outside of the loop being formed around the winding leg, but obviously includes the converse arrangement represented by Fig. 3 in which the strip is passed from the outside of the original coil of strip to the inside of the loop formed around the conductive winding leg. Likewise, although in Fig. 3 I have shown an arrangement in which the angle of the turns of strip is changed, and the strip is passed from the outside of the original coil of strip to the inside of the loop formed around the winding leg, it will be understood that in using my arrangement for changing the angle of the coil of strip I am not limited to using the precise arrangement shown in Fig. 3 in which the strip material passes from the outside of the original coil of strip to the inside of the loop formed around the conductive winding leg, but that my invention obviously includes the converse arrangement represented in Fig. 2 in which the strip passes from the inside of the coil to the outside of the loop.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A machine for assembling wound-strip cores with preformed conductive winding structures, comprising a device for holding a winding structure in position to have a core applied to the winding leg thereof, means for rotatably supporting a coil of magnetic strip, power-driven rollers mounted away from the plane of said coil adapted to grip strip material between them and to rotate a loop of strip around the winding leg in a different plane from the plane of the said coil, and means for feeding strip away from the plane of said coil to said loop.

2. A machine for applying wound-strip magnetic cores to the winding legs of preformed conductive-winding structures, comprising a device for holding a winding structure with its winding leg in position to have a core applied thereto, power-driven rollers adapted to grip strip material between them and to rotate a loop of the strip around the winding leg, means for supporting a coil of magnetic strip material for feeding strip to said loop, means for guiding the strip material from the inside of a coil of strip carried by the coil supporting means to the outside of a loop gripped between the power-driven rollers, and means for rotating said coil supporting means at an angular speed corresponding to the peripheral speed of said power-driven rollers.

3. A machine for assembling wound-strip cores with preformed conductive-winding structures, comprising a device for holding a winding structure in position to have a core applied to the winding leg thereof, power-driven rollers adapted to grip strip material between them and to rotate a loop of such strip around the winding leg, means for supporting a coil of strip spaced away from said loop for feeding strip to the loop, and means for guiding strip drawn off the outside of said coil to the inside of the loop gripped by said power-driven rollers.

4. A method of assembling wound-strip cores with preformed conductive-winding structures, comprising the steps of forming a flatwise spirally wound coil of strip with the successive turns closely embracing the turns within, giving the strip material a permanent set tending to retain the turns of strip in their final size and shape, rotatably supporting said coil of strip near a conductive winding structure with which it is to be assembled, but in a different plane from the plane which the finished core is to occupy in the conductive winding structure, then unwinding the strip material from said coil starting at one end of the strip, forming away from the plane of said coil a loop around the conductive winding leg with the end portion of the strip drawn off from the coil, overlapping the strip material upon completion of the first turn of said loop to form successive layers of strip in the said loop in the same consecutive order as in the original coil of strip, rotating said loop to unwind all of the strip from the original coil and rewind it into the loop surrounding the winding leg of the conductive winding structure.

5. The method of applying a strain-free compactly flatwise wound coil of magnetic strip to the winding leg of a conductive winding structure, which method comprises the steps of unwinding the coil of strip from the inside, passing the inside end of the coil of strip around the winding leg of the conductive structure to form a loop spaced away from said coil, rotating said loop and simultaneously rotating the coil of strip to transfer the strip material from the inside of the coil to the outside of the loop until all of the strip material has been transferred from the coil to the loop with the turns in the same consecutive order in the loop around the winding leg as in the original coil of strip.

6. The method of applying a strain-free, compactly flatwise-wound coil of magnetic strip to the winding leg of a conductive winding structure, which method comprises the steps of drawing out the inner turns of the coil of strip axially to form a conical spiral and bring the inner turns of the coil of strip into a different plane from the main portion of the coil of strip, unwinding the coil of strip from the inside, passing the inside end of the coil of strip around the winding leg of the conductive winding structure to form a loop, rotating said loop and simultaneously rotating the coil of strip to transfer the strip material from the inside of the coil to the outside of the loop until all of the strip material has been transferred from the coil to the loop with the turns in the same consecutive order in the loop around the winding leg as in the original coil of strip.

7. The method of applying a flatwise, compactly wound spiral coil of strip material to the winding leg of a conductive winding structure to form a magnetic core therein, which method comprises the steps of unwinding the outside layers of the coil of strip, passing the end of the coil around the winding leg of the conductive winding structure to form a loop linking the conductive winding structure and spaced away from the said coil, overlapping the end of the strip and passing the strip from the coil to the inside of the loop so formed without straining the strip beyond the elastic limit sufficiently to have any deleterious effect upon the magnetic properties, rotating the loop and simultaneously unwinding the coil of strip until all of the strip material has been transferred to the winding leg, thus causing the turns of strip in the loop to have the same consecutive order as in the original coil of strip.

8. The method of applying a flatwise, compactly wound spiral coil of strip material to the winding leg of a conductive winding structure to form a magnetic core therein, which method comprises the steps of rotating and unwinding the outside layers of the coil of strip, twisting the unwound portion of the strip to change the angular position of the axis of rotation of the moving strip, passing the end of the coil around the winding leg of the conductive winding structure to form a loop linking the conductive winding structure and having an axis at an angle to the axis of the original coil of strip, overlapping the end of the strip and passing the strip from the coil to the inside of the loop so formed without straining the strip beyond the elastic limit sufficiently to have any deleterious effect upon its magnetic properties, rotating the loop and simultaneously unwinding the coil of strip until all of the strip material has been transferred to the winding leg, thus causing the turns of strip in the loop to have the same consecutive order as in the original coil of strip.

9. A method of applying a strain-free, compactly flatwise-wound coil of magnetic strip to the winding leg of a conductive winding structure to form a magnetic core thereon, which method comprises the steps of unwinding the strip material from said coil, starting at one end of the strip, passing the said end of the strip substantially along a circular path in a different plane from the plane of the coil of strip around the conductive winding leg to form a loop encircling the said conductive winding leg, overlapping the strip material upon completion of the first turn of said loop to form successive layers of strip in the said loop in the same consecutive order as in the original coil of strip, rotating said loop to unwind all of the strip from the original coil and rewind it into the loop surrounding the winding leg of the conductive winding structure.

ARAM BOYAJIAN.